(12) United States Patent
Zheng et al.

(10) Patent No.: US 12,399,415 B2
(45) Date of Patent: Aug. 26, 2025

(54) TUNABLE OPTICAL METASURFACES BASED ON SLOT MODE RESONANCES

(71) Applicant: CALIFORNIA INSTITUTE OF TECHNOLOGY, Pasadena, CA (US)

(72) Inventors: Tianzhe Zheng, Pasadena, CA (US); Andrei Faraon, La Canada Flintridge, CA (US); Hyounghan Kwon, Pasadena, CA (US); Yiran Gu, Pasadena, CA (US); Bilgehan Baspinar, Pasadena, CA (US); Phillippe MJ Pearson, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 343 days.

(21) Appl. No.: 18/189,074

(22) Filed: Mar. 23, 2023

(65) Prior Publication Data
US 2023/0314898 A1    Oct. 5, 2023

Related U.S. Application Data

(60) Provisional application No. 63/325,032, filed on Mar. 29, 2022.

(51) Int. Cl.
    *G02F 1/29*    (2006.01)

(52) U.S. Cl.
    CPC ........ *G02F 1/292* (2013.01); *G02F 2201/346* (2013.01); *G02F 2202/10* (2013.01); *G02F 2202/30* (2013.01); *G02F 2202/36* (2013.01); *G02F 2203/04* (2013.01); *G02F 2203/15* (2013.01)

(58) Field of Classification Search
    CPC .............. G02F 1/292; G02F 2201/346; G02F 2202/10; G02F 2202/30; G02F 2202/36; G02F 2203/04; G02F 2203/15
    See application file for complete search history.

(56) References Cited

U.S. PATENT DOCUMENTS

| 9,735,885 | B1 * | 8/2017 | Sayyah | ................... | G02F 1/292 |
| 2016/0336643 | A1 * | 11/2016 | Pascolini | ............. | H01Q 9/0421 |
| 2018/0342794 | A1 * | 11/2018 | Han | ........................ | H04B 1/18 |

OTHER PUBLICATIONS

Kwon et al., "Nano-electromechanical tuning of dual-mode resonant dielectric meta-surfaces for dynamic amplitude and phase modulation," Nano Lett. 21, 2817-2823 (2021).
Koshelev et al., "Asymmetric metasurfaces with high-q resonances governed by bound states in the continuum," Phys. review letters 121, 193903 (2018).

(Continued)

*Primary Examiner* — Mariam Qureshi
(74) *Attorney, Agent, or Firm* — Steinfl + Bruno LLP

(57) ABSTRACT

Tunable optical structures operating based on slot resonances can be produced with periodic structures where each period includes at least two parallel nanobars with a slot therebetween. The slots include periodic notches served to generate resonances, the wavelength and the quality-factor of which can be controlled by applying bias voltages to nanobars thus generating mechanical movement of such nanobars. Phase modulators with close to unity reflection and beam steering devices can also be made based on these concepts.

28 Claims, 10 Drawing Sheets

(56) References Cited

OTHER PUBLICATIONS

Klopfer et al., "Dynamic Focusing with High-Quality-Factor Metalenses," Nano Lett. 2020, 20, 5127-5132.
Klopfer et al., "High-Quality-Factor Silicon-on-Lithium Niobate Metasurfaces forElectro- optically Reconfigurable Wavefront Shaping," Nano Lett. 2022, 22, 1703-1709.
Lawrence et al., "High quality factor phase gradient metasurfaces," Nature Nanotechnology, Nov. 2020, vol. 15, 956-961.
Lawrence et al., "Nonreciprocal Flat Optics with Silicon Metasurfaces," Nano Lett. 2018, 18, 1104-1109.
Lawrence et al., "High quality factor phase gradient metasurfaces," Nat. Nanotechnol. 15, 956-961 (2020).
Zheng et al., "Nanoelectromechanical tuning of high-q slot metasurfaces," Nano Lett. 2023, https://doi.org/10.1021/acs.nanolett.3c00999. 7 pages.

\* cited by examiner

TUNABLE OPTICAL METASURFACES BASED ON SLOT MODE RESONANCES

CROSS REFERENCE TO RELATED APPLICATIONS

The present application claims priority to U.S. Provisional Patent Application No. 63/325,032 filed on Mar. 29, 2022, incorporated herein by reference in its entirety.

STATEMENT OF GOVERNMENT GRANT

This invention was made with government support under Grant No. EY029460 awarded by the National Institutes of Health. The government has certain rights in the invention.

FIELD

The present disclosure is related optical metasurfaces, more in particular to tunable optical metasurfaces based on slot resonances.

BACKGROUND

Optical metasurfaces are planar arrays of sub-wavelength scatterers that enable the control of optical fields that pass through them. The control is usually achieved via a weakly resonant effect of the scatterers. In order for the control to have a high spatial resolution, it is important for these resonances to be spatially localized. One way to create spatially localized resonances is to use optical scatterers with high refractive index, such as silicon or amorphous silicon.

Many applications have been developed based on static non-tunable metasurfaces. However, a lot of applications would be enabled by tunable optical metasurfaces, such as optical phased arrays that can be used in applications like optical beam steering for Lidar and optical beam formation. One of the main issues with metasurfaces is that they are difficult to tune because the mechanisms for refractive index change generally provide a small refractive index modulation. In order to achieve tunability, it becomes important to use metasurfaces that exhibit high quality factors. However, increasing the quality factor leads to metasurfaces that have a delocalized mode, which limits the spatial resolution.

In the last decade, optical metasurfaces have demonstrated the capabilities of controlling phase, polarization, amplitude using a thin layer of artificially designed nanostructures. This discovery has led to numerous applications such as lenses, holograms and spectrometers, and unveiled the potential of compact but multifunctional optical devices. However, as mentioned previously, most of the metasurfaces have static optical responses defined through designs, which cannot meet the need for dynamic manipulation of optical properties. In order to address this issue, efforts have been made to incorporate different tuning mechanisms with the metasurfaces to achieve reconfigurable optical modulations in amplitude, phase, or polarization. For example, carrier injection in transparent conducting oxides has been shown to achieve efficient phase tuning. However, the use of the epsilon-near-zero regime causes large absorption and thus the overall efficiency is low. Phase-change materials achieve large refractive index tuning $\Delta n \approx 1$, but the intrinsic material properties limit continuous index tuning and endurance. Recently, it was shown that electro-optic polymers with record high r33 could also achieve large refractive index tuning with GHz speed. However, the low operation voltage and stability in ambient conditions remain challenges for a wide range of applications

SUMMARY

The disclosed methods and devices address and provide solution to the above-mentioned issues and challenges. The described devices include optical metasurfaces that are tuned based on slot resonances. Throughout this document, the term "slot resonances" is referred to the modes that are confined in a low refractive index region located in between two high refractive index regions and have direct coupling to the free-space environment. They are usually in the form of two parallel bars disposed close to each other such that, the spacing in-between the two bars is substantially smaller than the wavelength of the light. The parallel bars usually have periodic perturbation in terms of refractive index. As will be described more in detail later, such perturbation may be preferably implemented using notches.

According to a first aspect of the present disclosure, a tunable optical structure cell is provided, comprising two pairs of nanobars, each pair including two adjacent parallel nanobars with a first slot therebetween; wherein: the nanobars and are oriented along a first direction, and positioned adjacent to each other along a second direction, the second direction being perpendicular to the first direction; each first slot is oriented along the first direction; each first slot comprises perturbations arranged periodically along the first direction; one nanobar of each pair of nanobars is configured to receive a first bias voltage and the other nanobar of the same pair is configured to receive a second bias voltage, the second bias voltage being different from the first bias voltage; a bias voltage received by two nanobars that are adjacent but belong to different pairs are the same; the tunable optical structure cell is configured to receive an optical signal, thus generating a slot resonance, and a wavelength and quality-factor of the slot resonance is controlled based on a selection from one or more of a) a depth along the first or the second direction of each notch, b) a width of each notch, c) a width of the first slot, d) the period of the notch along the first slot, and a difference of the first and the second bias voltages.

According to a second aspect of the present disclosure, a tunable optical structure cell is provided, comprising a first, a second, a third, and a fourth pairs of nanobars, each of the first and the fourth pair including two adjacent parallel nanobars with a first slot therebetween, and each of the second and the third pair including two adjacent parallel nanobars with a second slot therebetween, and wherein: the nanobars are oriented along a first direction, and positioned adjacent to each other along a second direction; the second direction being perpendicular to the first direction; the first and the second slots are oriented along the first direction; the first and the second slot comprises, each, notches arranged periodically along the first direction; the nanobar pairs are positioned adjacent to each other along the second direction such that the second nanobar pair is interposed between the first and the third nanobar pair, and the third nanobar pair is interposed between the second and the fourth nanobar pair; the first and the fourth nanobar pairs are structurally replicas of each other, and the second and the third nanobar pairs are structurally replicas of each other; within each of the first and the fourth nanobar pairs, one nanobar is configured to receive a first bias voltage and the other nanobar of the same pair is configured to receive a second bias voltage, the second bias voltage being different from the first bias voltage; within each of the second and the third nanobar pairs, one nanobar is configured to receive a third bias voltage and the other nanobar of the same pair is configured to receive the first bias voltage, the third bias voltage being different or same from the first bias voltage; a bias voltage received by two nanobars that are adjacent but belong to different pairs are the same; the tunable optical structure cell is configured to receive an optical signal, thus generating a first slot resonance in correspondence with the first slots, and a second slot resonance in correspondence with the second slots; wavelength and quality-factor of the first slot resonance is controlled based on a selection from one or more of a1) a depth along the first or the second direction of each notch of the first slot, b1) a width of each notch of the first slot, c1) a width of the first slot, d1) the period of the notch along the first slot, and a difference of the first and the second bias voltages, and independently from the wavelength and the quality-factor of the first slot resonance, a wavelength and quality-factor of the second slot resonance is controlled based on a selection from one or more of a1) a depth along the first or the second direction of each notch of the second slot, b1) a width of each notch of the second slot, c1) a width of the second slot, d1) the period of the notch along the second slot, and a difference of the first and the third bias voltages.

According to a third aspect of the present disclosure, A beam-steering structure cell comprising: a pair of blocking nanobars; a pair of parallel nanobars with a first slot therebetween; the pair interposed between the blocking nanobars of the pair of blocking nanobars; a mirror disposed underneath nanobars and blocking nanobars; wherein: the nanobars and are oriented along a first direction, and positioned adjacent to each other along a second direction; the second direction being perpendicular to the first direction; the blocking nanobars are oriented along the first direction and positioned along the second direction; each first slot is oriented along the first direction; each first slot comprises notches arranged periodically along the first direction; one nanobar of the pair of nanobars is configured to receive a first bias voltage and the other nanobar of the pair is configured to receive a second bias voltage, the second bias voltage being different from the first bias voltage; the beam-steering structure cell is configured to receive an optical signal, thus generating a slot resonance; a wavelength and quality-factor of the slot resonance is controlled based on a selection from one or more of a) a depth along the first or the second direction of each notch, b) a width of each notch, c) a width of the slot, d) the period of the notch along the first slot, and a difference of the first and the second bias voltages.

According to a fourth aspect of the present disclosure, a method of tuning a wavelength and quality-factor of a resonance of an optical structure is disclosed, the method comprising: providing four pairs of nanobars; disposing the two nanobars of each pair side to side and in parallel with each other; orienting the nanobars along a first direction and arranging the nanobars along a second direction, the second direction being perpendicular to the first direction; forming a slot in-between the two bars of each pair of nanobars; forming notches along each slot; the notches being periodically arranged along the first direction; adjusting one or more of a) a depth along the first direction of the notches, b) a depth along the second direction of the notches, c) a width of the nanobars, d) the period of the notch along the slot, in correspondence with a desired slot resonance wavelength; illuminating the optical structure with an optical signal, thus generating a slot resonance having the desired wavelength in each slot; applying a first bias voltage to a first nanobar of a first pair of the four pairs of nanobars; applying a second bias voltage to a second nanobar of the first pair of the four pairs of nanobars; applying the second bias voltage to a first nanobar of a second pair of the four pairs of nanobars; applying a third bias voltage to a second nanobar of the second pair of the four pairs of nanobars; applying the third bias voltage to a first nanobar of a third pair of the four pairs of nanobars; applying the second bias voltage to a second nanobar the third pair of the four pairs of nanobars; applying the second bias voltage to a first nanobar of a fourth pair of the four pairs of nanobars, and applying the first bias voltage to a second nanobar of the fourth pair of the four pairs of nanobars.

Further aspects of the disclosure are provided in the description, drawings and claims of the present application.

DETAILED DESCRIPTION

Throughout this document, the term "period" of a structure or a "structure cell" represents a portion of the structure such that the structure can be formed through periodic repetition, along a certain axis, of such "period" or "structure cell". In other words, the structure can be obtained by concatenating multiple identical units, or "periods", or "structure cells" along the axis in a periodic manner. Stated differently, a structure can be formed by periodic repetition of its "structure cell" or its "period" along certain axis.

Figure 1A:
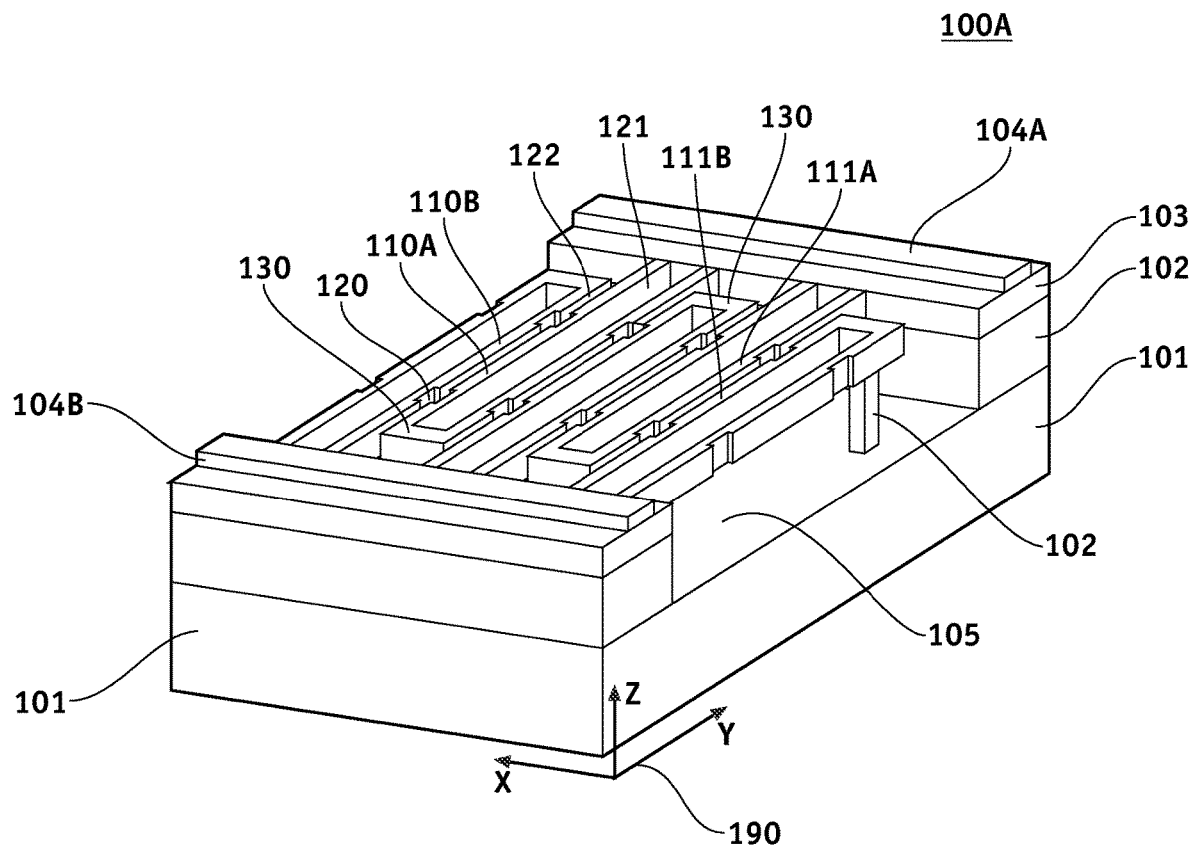
FIG. 1A shows an exemplary optical structure according to an embodiment of the present disclosure.
Figure 1B:
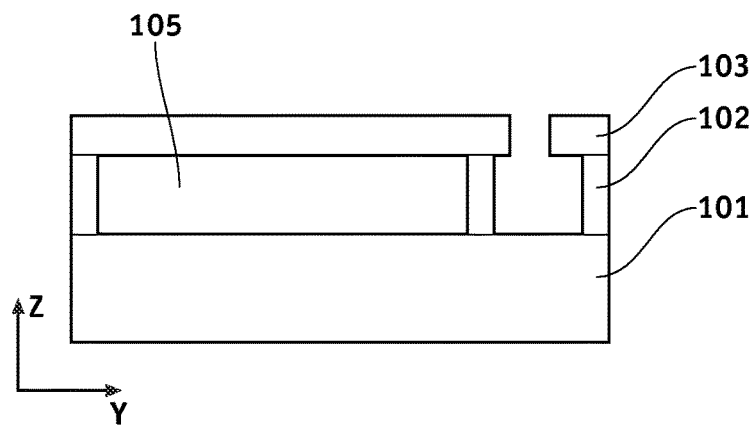
FIG. 1B shows a cross-sectional view of the embodiment of FIG. 1A.
Figure 1C:
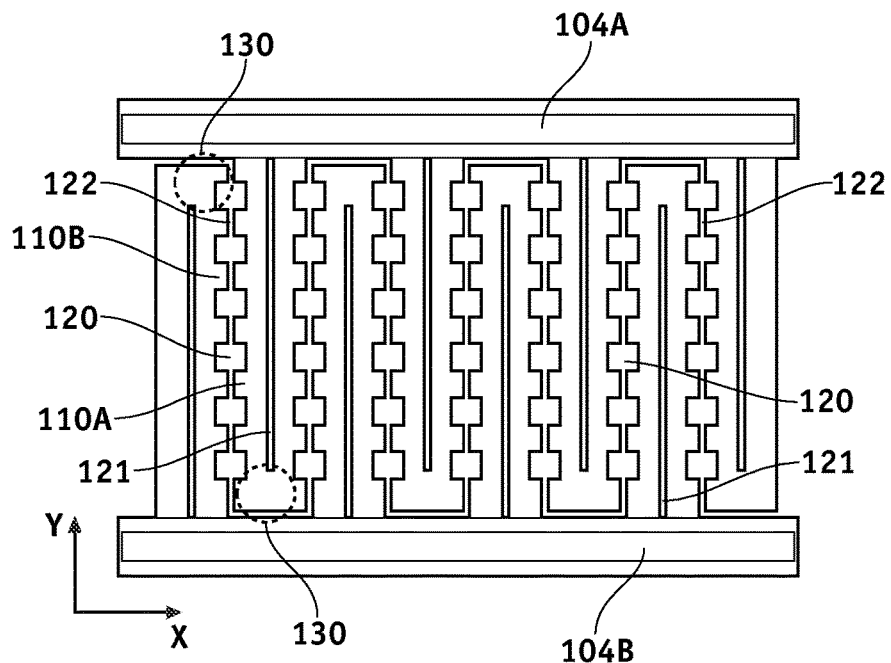
FIG. 1C shows a top-view, of the embodiment of FIG. 1A.
Figure 1D:
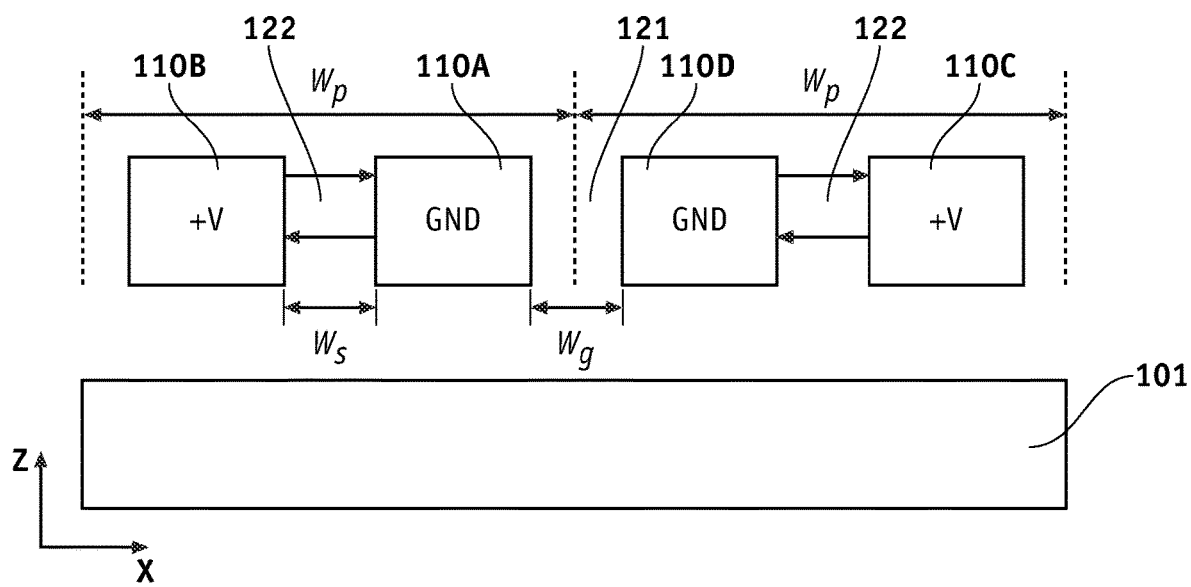
FIG. 1D shows an exemplary optical structure cell according to an embodiment of the present disclosure.

FIG. 1A shows an exemplary optical structure (100A) according to an embodiment of the present disclosure. A cartesian coordinate (190) is also shown in this figure. The x, y, and z axes of such coordinate are used throughout this document as a reference to indicate different directions. FIGS. 1B-1C show a cross section along a nanobar, i.e. the y-axis direction, and the top view of optical structure (100A) of FIG. 1A, respectively. Moreover, FIG. 1D shows a cross section, along the x-axis direction, of a period of optical structure (100A) of FIG. 1A. It is evident from the figure that the two pairs of adjacent nanobars possess geometrical similarity, resulting in the structure exhibiting two periods if only the geometry is taken into account. However, when considering the distinction in the applied voltages between each pair, it is necessary to regard the structure as constituting one period of the overall optical structure.

As can be seen in FIGS. 1A, 1C, optical structure (100A) is initially manufactured based on three layers (101, 102, 103). First layer (101) comprises a higher refractive index material, e.g. silicon, and serves as the base of the structure. Second layer (102), disposed on top of first layer (101), is made of an oxide, e.g. silicon-dioxide and third layer (103), disposed on top of layer (102) is made with the same higher refractive index material as first layer (101), e.g. silicon. During the manufacturing process, layers (102, 103) are partially etched away in a specific way to provide desired optical properties which will be described in more detail later in the document. As shown in FIGS. 1A-1B, as a result of the etching process the structure is left with an interstitial region (105) which can be filled with air or other non-conductive material served as a lower index material for the structure. According to the teachings of the present disclosure, optical structure (100A) may be advantageously fabricated using a commercial silicon-on-insulator (SOI) wafer. In some embodiments, layer (101) is optional, thereby allowing the fabrication of the optical structure using two layers. Furthermore, when layer (101) is implemented, the material used to fabricate layer (101) differs from that of layer (102). In further embodiments, layer (103) is made of a material which has a refractive index greater than the refractive index of the material used to fabricate layer (102).

Referring to FIGS. 1A, 1C, optical structure (100A) represents basically a Nanoelectromechanical system (NEMS) comprising a plurality of nanobars arranged along the y-direction and in parallel with each other, the parallel arrangement extending along the x-direction. Each pair of nanobars (110A, 110B) includes two adjacent nanobars spaced apart by a first slot (122). Each nanobar includes perturbations of refractive index along the y-axis direction, the perturbations being preferably implemented using notches (120) arranged periodically along the y-axis. As will be described later in more detail, the notches serve to create high-Q resonances. A second slot (121) is formed between any two neighboring pairs of nanobars. Such second slot is oriented along the y-axis direction. Second slots (121) may not include any notches. Within each pair of nanobars in a period, the two nanobars are connected to different terminals (104A, 104B) for electrical biasing. For example, nanobar (110A) is connected to terminal (104A) and nanobar (110B) is connected to terminal (104B). As shown in FIG. 1C, in order to enhance the robustness of the structure, the two bars with the same voltages are linked together at the anchors (130), the anchors essentially representing the areas at the extremities of the second slots (121) where such nanobars are interconnected.

Figure 1E:
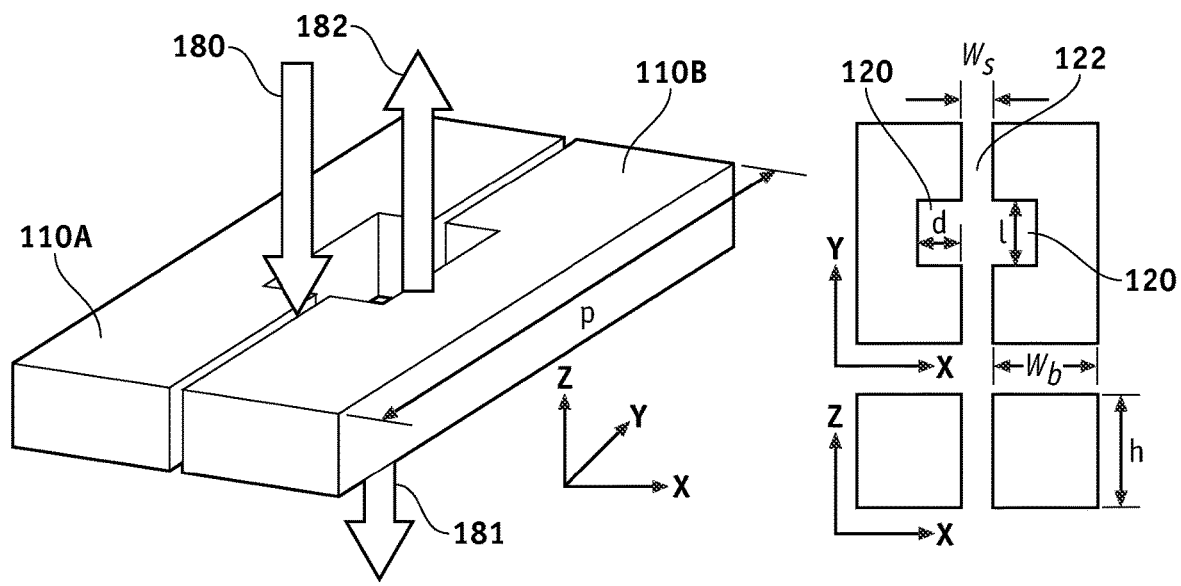
FIG. 1E shows a period of a pair of adjacent nanobars of the embodiment of FIG. 1A.

One period of the pair of adjacent nanobars (110A, 110B) is shown in FIG. 1E where various dimensional parameters associated with the structure are illustrated. Parameters (d, l) represents the depths of the notches (120) of each nanobar, along the x-axis and the y-axis direction, respectively. Parameter (h) stands for the height (z-axis direction) of each nanobar, while parameter (Wb) indicates the width, along the x-axis direction, of each nanobar. The width of slot (122) is denoted by parameter (Ws). In a preferred embodiment, all of the mentioned dimensional parameters are the same for every adjacent pair of nanobars, although other embodiments may also be envisaged where such parameters may differ from one pair of adjacent nanobar to another. The optical structure will receive incident light (180) from the top and as a result, a portion of light is reflected to generate reflected light (182) and the other portion of light, as indicated by through-light (181), passes through the optical structure.

Figure 1F:
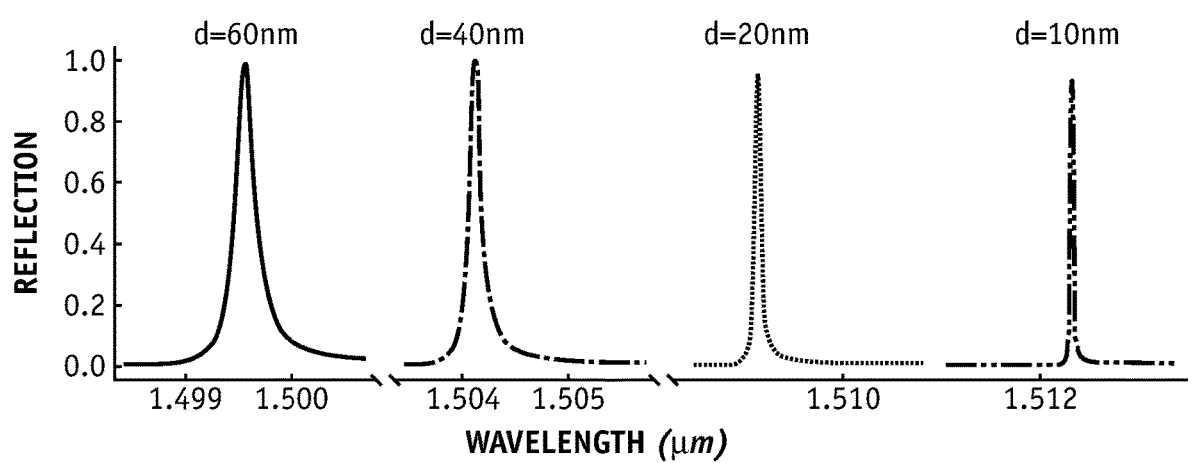
FIG. 1F shows the reflection spectra of the embodiment of FIG. 1A for various notch depths.
Figure 1G:
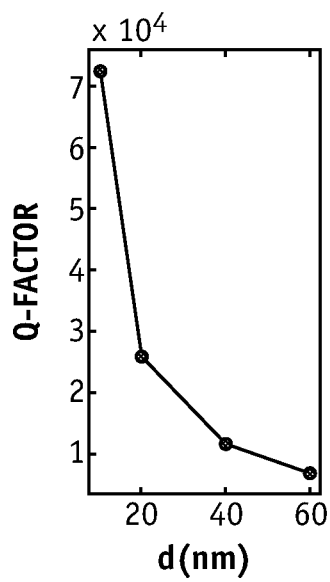
FIG. 1G shows the variation of the quality-factor of the slot resonance vs. the notch depth.

With reference to FIGS. 1A, 1C, and 1E, when the dimension of low refractive index media, more specifically parameter (Ws), is small, the electric field will be greatly enhanced due to the discontinuity of the high-refractive-index-contrast interfaces. In other words, upon receiving an incident light, each slot (122) will host a slot mode, where the electrical field is confined within the airgap/slot. Without notches (120), such slot mode is protected from free-space coupling because of the momentum unmatching. By virtue of creating notches along the gap, the radiation channel will be open, and the slot mode will create a high-Q resonance that can be accessed under the z-axis direction illumination. By tuning one or more of the above-mentioned dimensional parameters of the optical structure, both the quality factor (Q) and the wavelength of such resonances can be controlled. In order to illustrate the tunability of the optical structure, numerical simulations using only a pair of adjacent nanobars have been performed by the inventors and the results are shown in FIGS. 1F-1G. FIG. 1F shows the reflection spectra of the optical structure for different values of parameter (d), i.e. the depth of the notches. As can be noticed, the optical structure can be tuned into different wavelengths, by changing the depth (d) of the notches (120). When the depth (d) of the notches decreases, the resonance will shift and become sharper. FIG. 1G shows the variation of Q-factor vs. the depth (d) of notches (120).

According to the teachings of the present disclosure, the tuning of the optical structure (100A) can be performed via mechanical displacement of the nanobars. This can be done by moving the nanobars by applying a voltage between them. In order to further clarify this concept, reference is made to FIG. 1D showing a cross section, along the x-axis direction, of a period of the optical structure (100A) of FIG. 1A. Shown in FIG. 1D, are a first pair of adjacent nanobars (110A, 110B) and a second pair of adjacent nanobars (110C, 110D). As also shown, a voltage (+V) is applied to nanobars (110B, 110C) and the nanobars (110A, 110D) are ground. In other words, with reference to FIGS. 1A, 1C, voltage (+V) may be applied to terminal (104B), and terminal (104A) may be ground. According to the teachings of the present disclosure, the voltage setting is such that when there is a voltage difference between the adjacent nanobars of each pair, the electrostatic force will cause a reduction of the slot width (Ws) in each pair. In other words, the voltages applied to each nanobar and the closest nanobar of the neighboring pair are the same. Stated differently, in FIGS. 1A, and 1C-1D, proceeding along the x-axis direction, the sequence of the applied voltages to the nanobars would be . . . -V-ground-ground-V-V-ground-ground-V- . . . etc. In other words, the voltage setting of all the structure cells is the same. Parameter (Wg) represents the distance between each nanobar from the closest nanobar of the neighboring pair of nanobars. With reference to FIGS. 1A, 1C-1D, second slots (121) are basically indicative of the boundaries between neighboring pairs of nanobars, and proceeding, along the x-axis direction, the distance from one second slot (121) to the following one is represented by parameter (Wp).

Figure 1H:
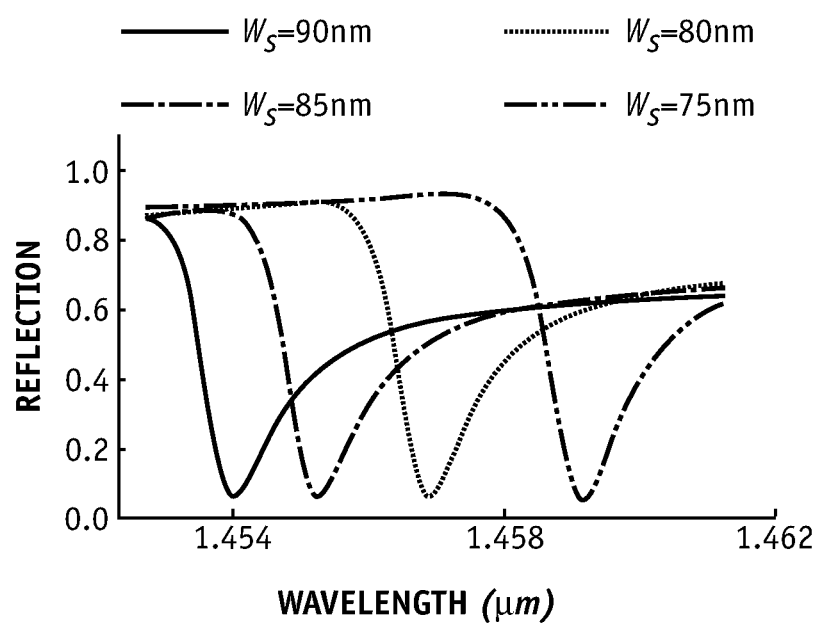
FIG. 1H shows the reflection spectrum for different slots widths.
Figure 1I:
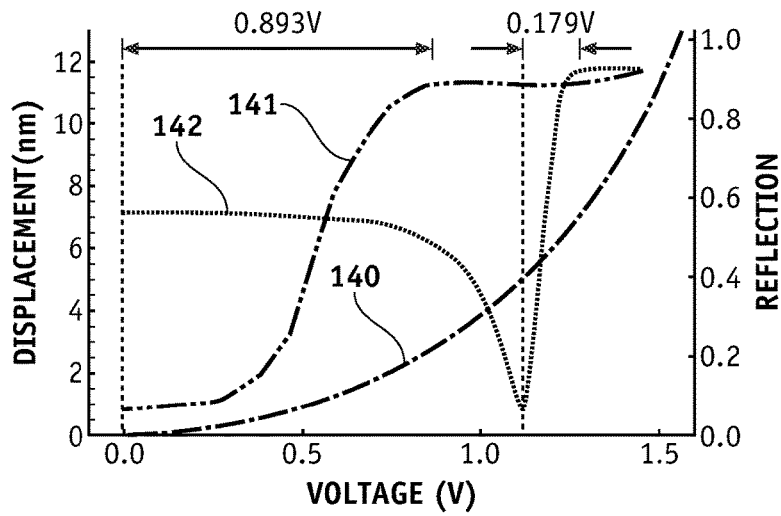
FIG. 1I shows the mechanical movement at the center of a nanobar and the absolute reflection for different wavelength values.

To further describe the performance of optical structure (100A) of FIG. 1A, reference is made to FIG. 1H where the reflection spectrum for different slot widths (Ws) are plotted. The exemplary values of parameter (Ws) are indicated by the legend of the graph. As parameter (Ws) becomes smaller, the resonance shows a larger amount of the redshift, i.e. the resonance occurs at larger wavelengths. To investigate the correlation between the bias voltage and the maximum displacement, simulations of mechanical displacement under varying voltages were conducted by the inventors, with nanobars having lengths of 33 μm. In FIG. 1I, the mechanical movement (along the x-axis direction) at the center of the nanobar and the absolute reflection at input wavelength $\lambda=1.4573$ μm (where R=0.05 when Ws=80 nm) and $\lambda=1.4544$ μm (where R=0.05 when Ws=90 nm) is plotted as the function of the applied voltage. This is shown by curve (140). Also shown are curves (141, 142) depicting the modulation of the reflection amplitude at wavelengths (1.4544 μm, 1.4573 μm), respectively. The maximum displacement along the x-axis direction of each nanobar approximately has a quadratic relationship with the bias voltage, and within 1.5V, the maximum displacement for each bar is over 10 nm. Thanks to the high sensitivity of the slot resonance, the reflection amplitude will have 11.9 dB modulation from 0 V to 0.926 V, and 12.3 dB modulation from 1.117 V to 1.296 V. The results indicate that a high extinction ratio could be accomplished within CMOS-level voltage with the disclosed optical structure. With further references to FIGS. 1A-1D it is appreciated that the tuning of the optical structure and the quality factor of slot resonances can be controlled by varying one or more of parameters (Ws, Wp, Wg, WFb, d, 1, h) and the voltages applied to the structure. This will result in a substantially improved design flexibility when implementing such optical structures.

One of the properties of the slot mode resonance is that the mode remains locally resonant within the slot. In accordance with the teachings of the present disclosure, if different slots are designed to be resonant at different wavelengths, the device can achieve individual optical tuning at multiple wavelengths under proper electrical configurations.

Figure 2A:
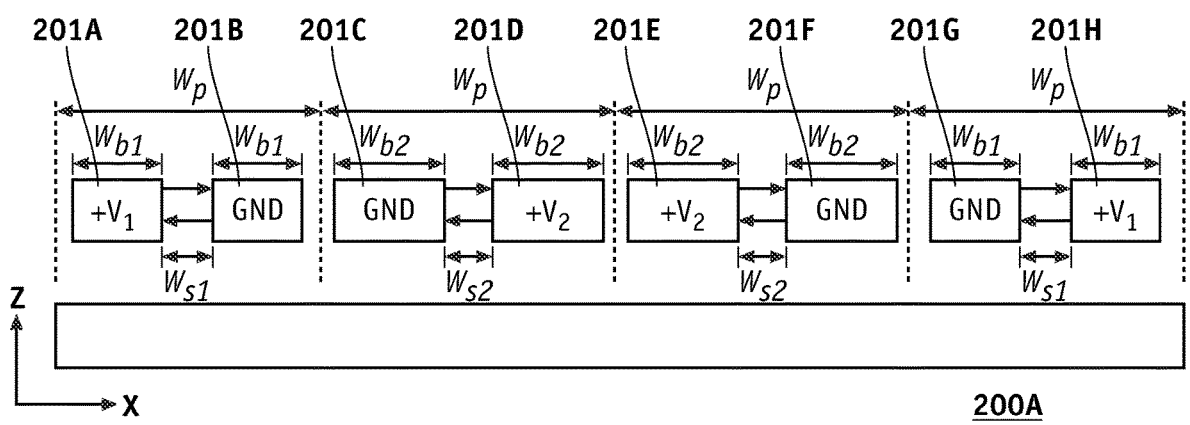
FIG. 2A shows an exemplary optical structure cell according to an embodiment of the present disclosure.

FIG. 2A shows a cross section (along the x-axis direction) of a structure cell (200A) of an exemplary optical structure in accordance with an embodiment of the present disclosure. The principle of operation and functionality of the optical structure made of a periodic repetition of structure cell (200A) is similar to what was described with regards to optical structure (100A) of FIGS. 1A-1C, except that a specific voltage setting for each cell is implemented here to achieve, independently, tunability at two different wavelengths and the structure cell (201A,201B,201G,201H) and (201C,201D,201E,201F) have slightly different width (Wb1 and Wb2) to support resonances in different wavelengths. As shown, structure cell (200A) comprises four pairs of nanobars, e.g. pair of nanobars (201A, 201B) or (201E, 201F), etc. The voltage setting in each pair is either (V1, ground) or (V2, ground). Each pair hosts a slot resonance within the nanobars with the slot gap (Ws1) or (Ws2), the gaps being different from one another. Across the structure cell, the dimensions associated with the pairs receiving the same voltage are identical. Parameter (Wb1, Wb2) represents the widths of nanobars belonging to pairs receiving voltages (V1, V2) respectively. In an embodiment, parameters (Wb1, Wb2) may have different values, e.g. wb2−wb1=10 nm. In another embodiment, parameters (p,d,1) may have different values.

With continued reference to FIG. 2A, in the voltage setting shown, the slot widths (Ws1, Ws2) could be dominantly controlled by V1 and V2, respectively. In other words, the control voltage V1 (V2) mainly shrinks the gap ws1 (ws2) but does not affect the gap ws2 (ws1) since the electrostatic force will mostly affect the adjacent nanobar at a different voltage. Therefore, tuning voltage V1(V2) can control the corresponding slot gap ws1(ws2) while keeping the other slot gap ws2 (ws1) unchanged, and the period width remains constant. In accordance with an embodiment of the present disclosure, the voltages applied to each nanobar is the same as the one applied to the closest nanobar of the neighboring pair. For example, nanobars (201B, 201C) are both attached to ground, while nanobars (201D, 201E) both receive voltage (V2).

Figure 2B:
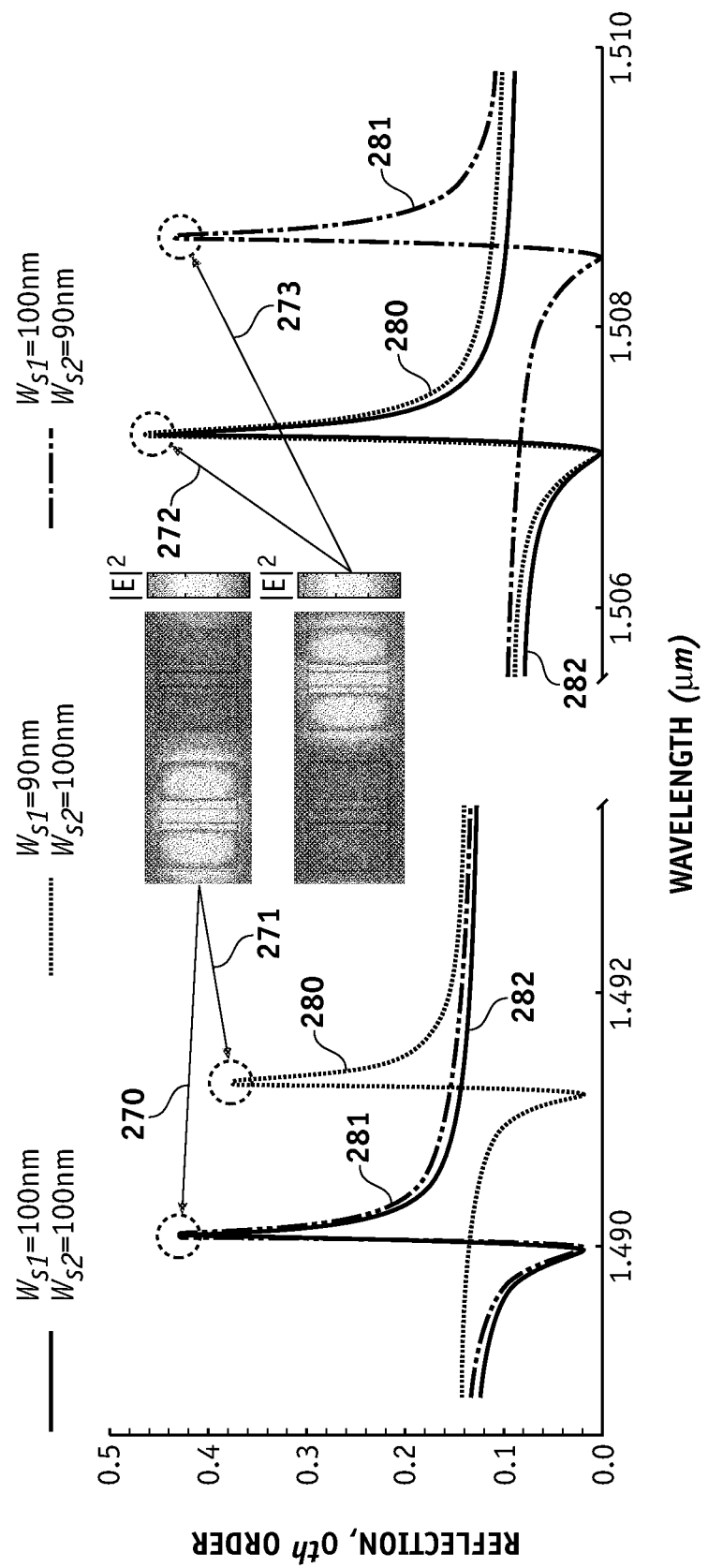
FIG. 2B shows the reflection spectra of the embodiment of FIG. 2A for different slots widths.

FIG. 2B shows the reflection spectra, for different initial values of parameters (Ws1, Ws2) when either of parameters (Ws1, Ws2) is controlled/changed separately/independently while keeping the other one constant. The electric field profiles in the corresponding resonance are also plotted, as indicated by arrows (270-273). The resonances in shorter (longer) wavelengths are related to the slot on the left (right), and the other slot remains non-resonant because of the frequency detuning. Since only half of the slots are excited in the resonance, the reflection modulation amplitude is limited to 50%. Thus, the maximum amplitude modulation is 13.3 dB in 1.491 μm and 20.5 dB in 1.509 μm. Curve (280/281) indicates that when we only control/change parameter (Ws1/Ws2), the resonance in low/high wavelength will show the redshift, but the other resonance remains almost undisturbed. In other words, the disclosed teachings enable the modulation of the reflectivity in multiple wavelengths independently.

Figure 3A:
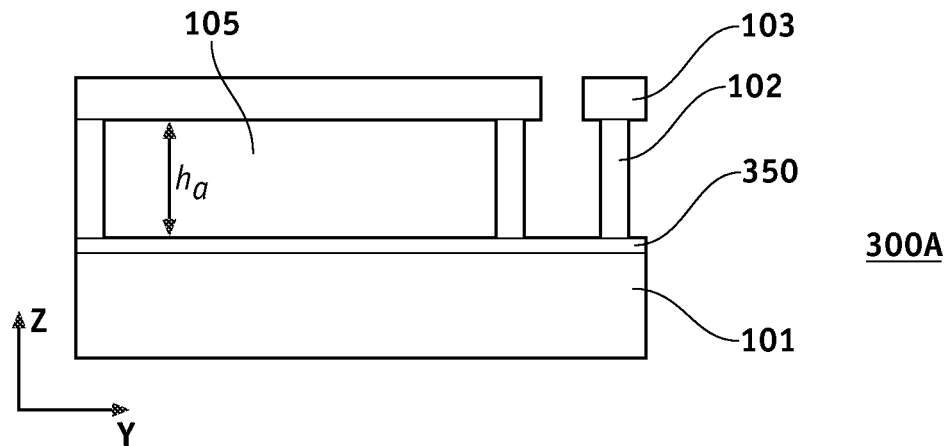
FIG. 3A shows a cross-section of an exemplary phase modulator according to an embodiment of the present disclosure.

With reference to the embodiments disclosed so far, although large amplitude modulations are achievable, the phase response may not be ideal due to undercoupling from the input plane wave to resonant mode. In accordance with the teachings of the present disclosure, the phase response can be enhanced, by implementing a mirror as part of optical structures (100A, 200A) of FIGS. 1A and 2A. In order to further clarify this phase-improving concept, reference is made to FIG. 3A showing a cross section of an exemplary optical structure (300A) in accordance with an embodiment of the present disclosure. The overall structure of the resulting optical structure is similar to what was disclosed with regards to optical structures (100A, 200A) except for the presence of a mirror. In other words, optical structure (300A) comprises mirror (350) disposed between the oxide layer (102) and the silicon substrate (101). Parameter (ha) indicates the thickness of the airgap (105), or stated differently, such parameter indicates the distance, along the z-axis direction, between mirror (350) and top layer (103). The function of the implemented mirror is to reflect the light and enhances the coupling between the resonant slot mode and the illuminated light from the top. As a result, the reflected phase response at the resonance will improve and approaches to nearly 2π. In an embodiment, the mirror is made of gold. In another embodiment, the mirror comprises a Bragg mirror.

Figure 3B:
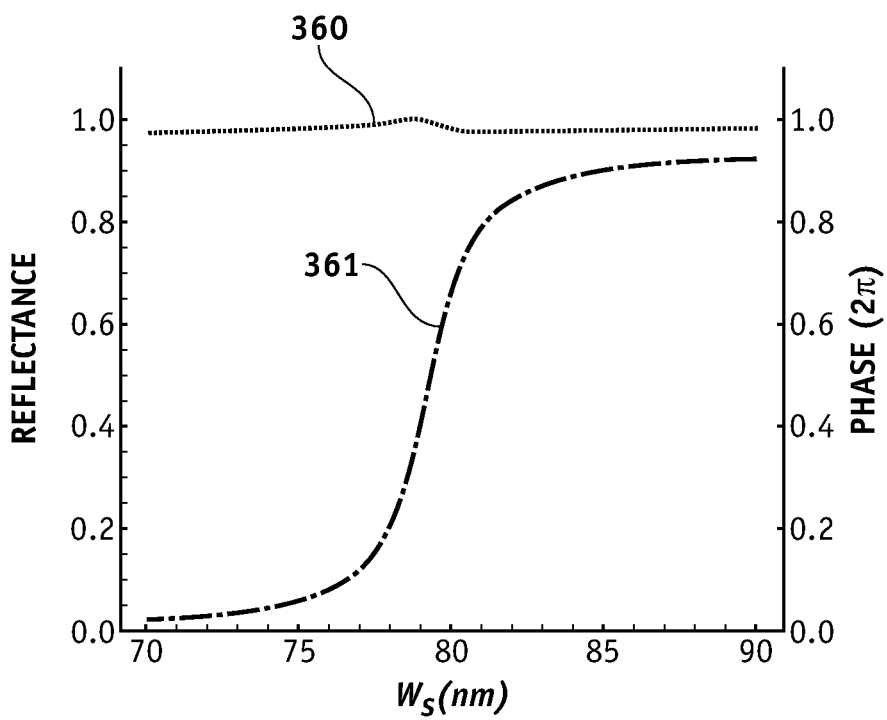
FIG. 3B shows the reflection amplitude and phase around the slot resonance as a function of different slot widths for the embodiment of FIG. 3A.
Figure 3C:
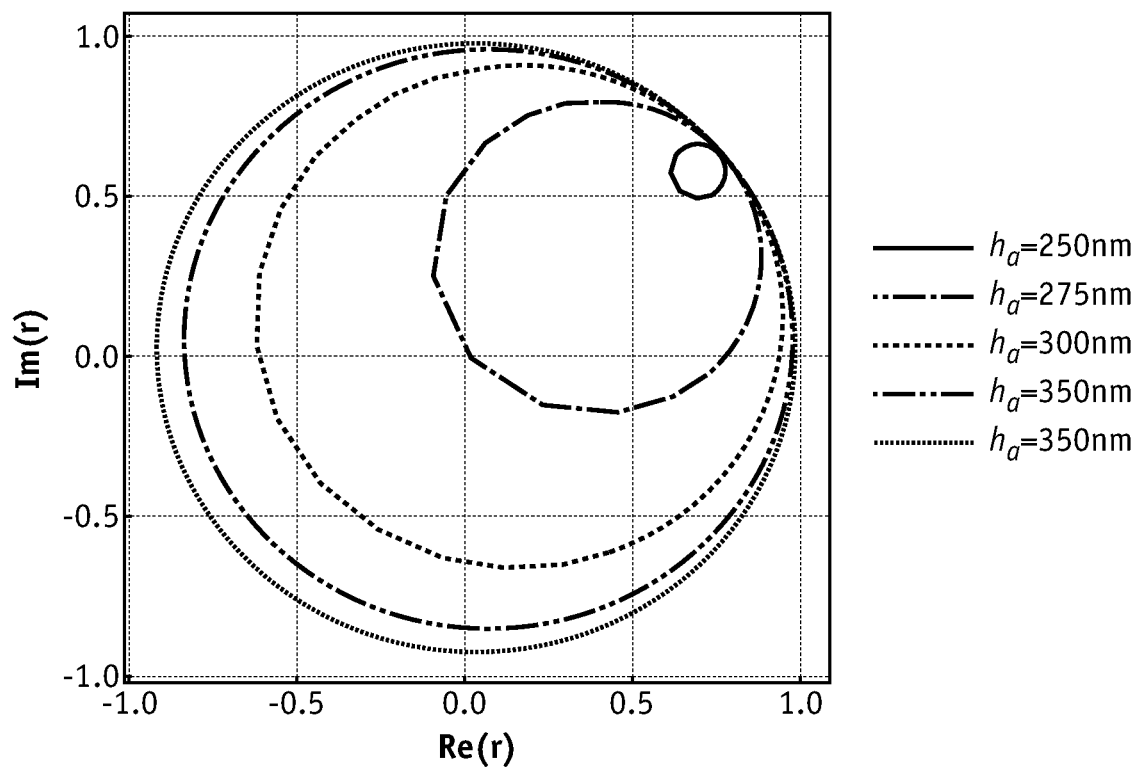
FIG. 3C shows the reflection coefficient in the complex plane around the slot resonance for different air gap thicknesses, for the embodiment of FIG. 3A.

FIG. 3B shows the reflection amplitude, curve (360), and phase, curve (361), around the slot resonance as a function of different slot sizes (Ws). As can be seen, by reducing the slot gap size from 90 nm to 70 nm, the reflectance remains over 97% while phase coverage is over 1.8π. FIG. 3C shows the reflection coefficient in the complex plane around the slot resonance for different air gap thicknesses (ha) ranging from 250 nm to 350 nm. As can be noticed, when selecting ha between 275 nm and 350 nm, a phase coverage 1.8π is achieved.

Figure 4A:
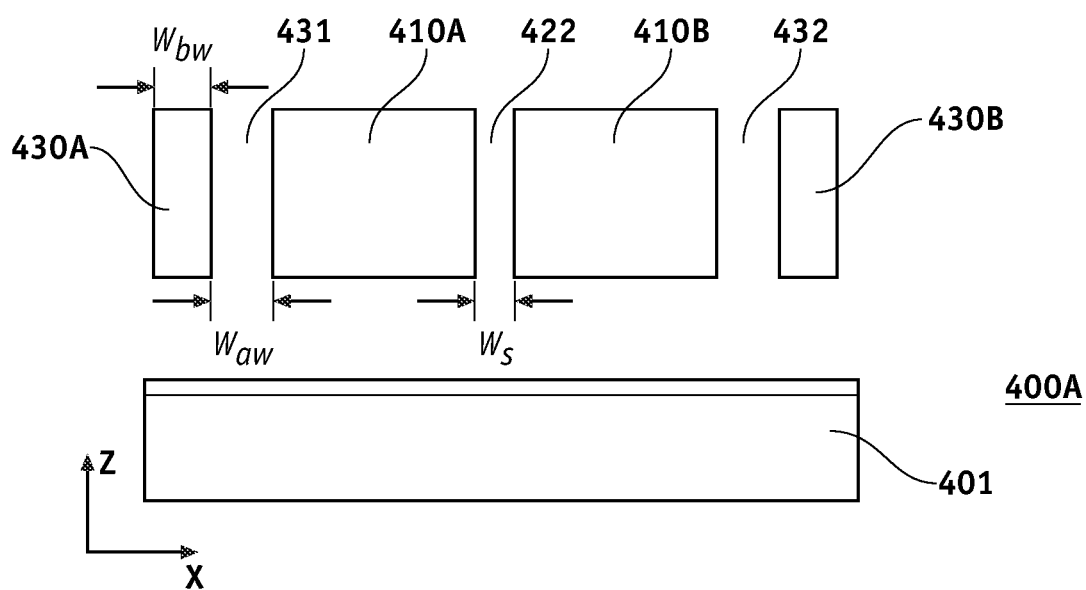
FIG. 4A shown a cross section of an exemplary optical structure cell according to an embodiment of the present disclosure.

The combination of the locally resonant slot mode and enhanced 2π phase modulation makes it possible to achieve one-dimensional spatial phase modulation at the wavelength-scale pixel level. In order to describe such concept, reference is made to FIG. 4A showing a cross section of an exemplary optical structure cell (400A) of an optical structure in accordance with an embodiment of the present disclosure. The overall structure of the optical structure made from periodic repetition of structure cells (400A) is similar to what was disclosed with regards to optical structures (300A) of FIG. 3A, except for the presence of a blocking nanobars (430A, 430B). To enable the spatial tuning of the optical structures disclosed previously, the cross-coupling between the adjacent slots should be blocked. This is essentially the main reason for implementing blocking nanobars (430A, 430B) to block the cross-coupling between the adjacent slots. The blocking nanobars may also be made from silicon. Parameter (Wbw) represents the width of spacing (431, 432) between each blocking nanobar (440A, 430B) and its adjacent nanobar (410A, 410B). Such spacing (Wbw) may or may not be equal to the width of slot (422) as indicated by parameter (Ws). According to the teachings of the present disclosure, in contrast with the case of nanobars (410A, 410B), blocking nanobars (430A, 430B) may not have any notches. Parameter (Wbw) stands for the width of blocking nanobars. Such width may be different from the width of nanobars (410, 410B). In an embodiment, parameter (Wb) may be equal to, for example, 100 nm to reduce the overall size of the optical structure while keeping the fabrication compatibility.

Figure 4B:
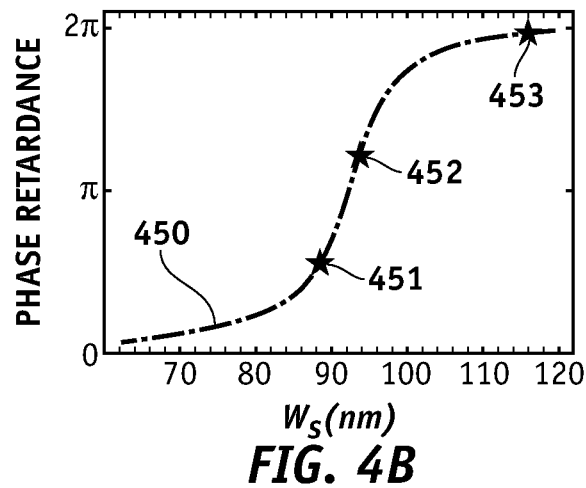
FIG. 4B shows the phase variation as a function of slot width for the embodiment of FIG. 4A.
Figure 4C:
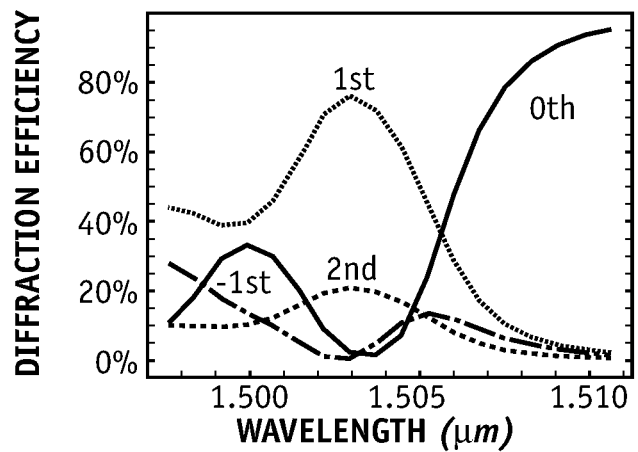
FIG. 4C shows various diffraction efficiencies of an exemplary beam-deflector according to an embodiment of the present disclosure.

FIG. 4B shows the phase variation as a function of slot width (Ws) for the optical structure made of structure cells (400A) of FIG. 4A as disclosed above. The three points (451, 452, 453) shown on curve (450) correspond to phases (0.55π,1.27π,1.97π) that are approximately spaced by 2π/3, and to widths (88.5 nm, 93.8 nm, 116 nm). According to the teachings of the present disclosure, a three-cell beam deflector may be made by concatenating three structure cells, similar to structure cell (400A) of FIG. 4A, along the x-axis direction. The slot widths of such beam deflector may be selected, for example, as Ws (88.5 nm, 93.8 nm, 116 nm) in correspondence with the above-mentioned three points (451-453) FIG. 4C illustrates various diffraction efficiency of the above-disclosed three-cell beam deflector. The major diffraction orders (−1 st,0 th,1 st,2 nd) are shown in this figure. As can be noticed the diffraction efficiency achieves maximum ~75% in 1.504 μm for the 1 st order.

With further reference to FIG. 4A, in accordance with the teachings of the present disclosure, the design of the deflector beam comprising three cells, as previously outlined, can be expanded to encompass multiple structure cells (400A) arranged periodically along the x-axis direction. This modification enables the fabrication of a quasi-continuous beam-steering device that offers smaller deflection angles in a quasi-continuous manner.

Figure 5:
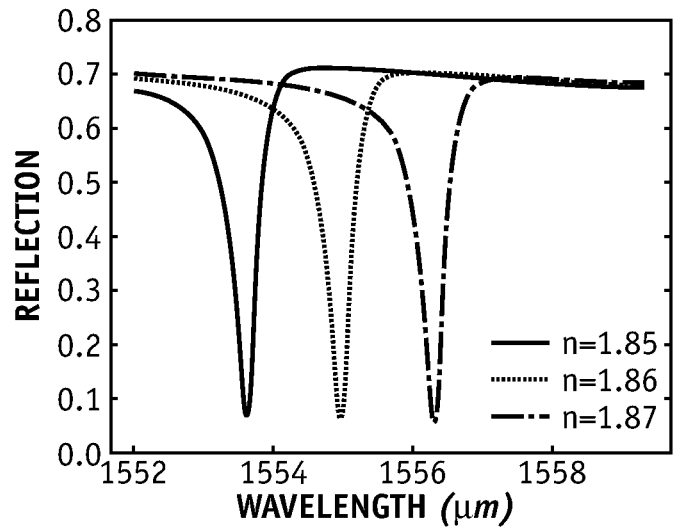
FIG. 5 shows the reflection spectrum for different refractive indices of polymer of an embodiment according to the present disclosure.

With reference to the embodiments of FIGS. 1A, 1C-1D, and 2A, according to the teachings of the present disclosure, slot resonances may be tuned using electro-optic effects based on tunable polymers. In other words, in such embodiments, the structure will be interstitially filled by a tunable polymer instead of air. Upon application of bias voltages, the refractive index of the polymer will be changed, and as a result, the wavelength of the slot resonances can be tuned to desired values. In order to demonstrate this, reference is made to FIG. 5 showing the reflection spectrum for different values of refractive index. As can be noticed, the spectra are redshifted for greater value of the refractive index.

Figure 6A:
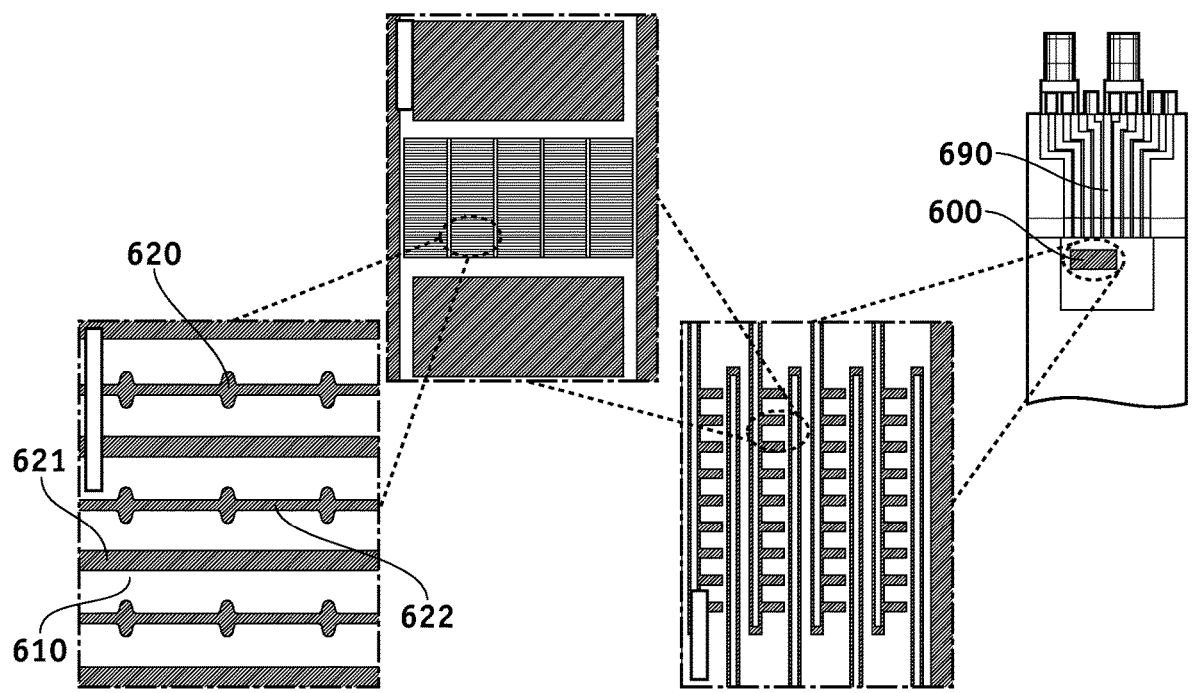
FIG. 6A shows various diagrams of a device fabricated according to the teachings of the present disclosure.
Figure 6B:
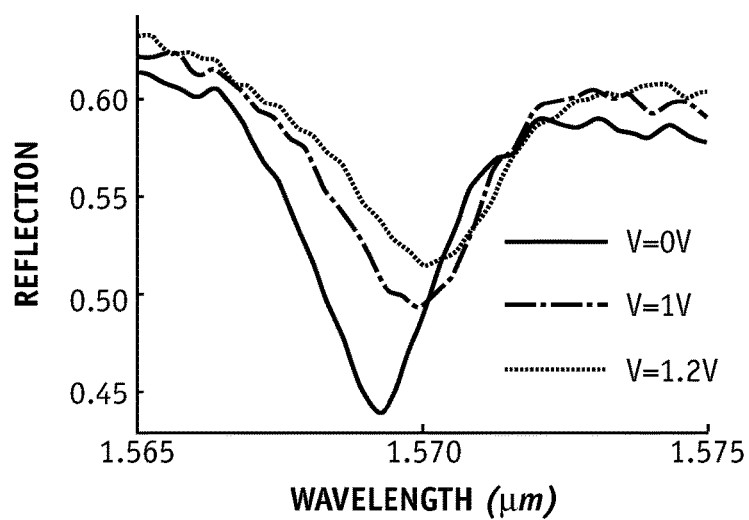
FIG. 6B show reflection spectrum of the device of FIG. 6A for different applied bias voltages.

FIG. 6A shows various diagrams of a device fabricated in accordance with the teachings of the present disclosure. Shown on the far right, is an optical camera photo of the fabricated chip (600) that is wire bonded to a customized print circuit board (690). Proceeding from the second diagram on the right to the left, the scanning electron microscopy images of the device (600) are shown, and the scale bars are 500 μm, 50 μm, and 1 μm respectively. Nanobars (610), slot (622) with notches (620) are also shown. FIG. 6B shows measured reflection spectrum of device (600) of FIG. 6A for different applied bias voltages. The wavelength tunability as a function of the applied bias voltage can be observed.

The invention claimed is:

1. A tunable optical structure cell comprising two pairs of nanobars, each pair including two adjacent parallel nanobars with a first slot therebetween;
wherein:
the nanobars are oriented along a first direction, and positioned adjacent to each other along a second direction, the second direction being perpendicular to the first direction;
each first slot is oriented along the first direction;
each first slot comprises notches arranged periodically along the first direction;
one nanobar of each pair of nanobars is configured to receive a first bias voltage and the other nanobar of the same pair is configured to receive a second bias voltage, the second bias voltage being different from the first bias voltage;
a bias voltage received by two nanobars that are adjacent but belong to different pairs are the same;
the tunable optical structure cell is configured to receive an optical signal, thus generating a slot resonance, and
a wavelength and quality-factor of the slot resonance is controlled based on a selection from one or more of a) a depth along the first or the second direction of each notch, b) a width of each notch, c) a width of the first slot, d) the period of the notch along the first slot, and a difference of the first and the second bias voltages.

2. The tunable optical structure cell of claim 1, wherein the first voltage is a positive voltage, and the second voltage is ground.

3. A tunable optical structure formed by arranging periodically, along the second direction, a multiple of tunable optical structure cells of claim 1.

4. The tunable optical structure of claim 3, further comprising multiple second slots, each second oriented along the first direction, and placed in between neighboring pairs of nanobars.

5. The tunable optical structure of claim 4, wherein the second slots are devoid of notches.

6. The tunable optical structure of claim 5, wherein a width of the second slots is different from the width of the first slots.

7. The tunable optical structure of claim 4, wherein the nanobars, the first and the second slots are formed within a first layer of a two-layer structure by etching away a portion of the first layer of the structure, the two-layer structure further comprising a second layer;
and wherein the first layer has a first refractive index, and the second layer has a second refractive index.

8. The tunable optical structure of claim 7, wherein the first layer comprises silicon and the second layer comprises silicon-dioxide.

9. The tunable optical structure of claim 7, wherein a portion of the second layer is etched away, thus forming a space filled with air within the second layer.

10. The tunable optical structure of claim 7, further comprising a first terminal configured to receive the first bias voltage, and a second terminal configured to receive a second bias voltage.

11. The tunable optical structure of claim 10, wherein in each pair of adjacent nanobars with the first slot in-between, one nanobar is connected to the first terminal and the other nanobar is connected to the second terminal.

12. The tunable optical structure of claim 11, wherein in each pair of adjacent nanobars with the second slot in-between, the nanobars are linked together at the extremities of the second slot.

13. A tunable optical structure cell of claim 1, wherein the first slots are filled with air.

14. A tunable optical structure cell of claim 1, wherein the first slots are filled with a tunable polymer.

15. The tunable optical structure of claim 4 wherein the nanobars, the first and the second slots are formed within a third layer of a multi-layer structure by etching away a portion of the third layer of the multi-layer structure, the multi-layer structure having a first, a second, and a third layer, and wherein the second layer is interposed between the first layer and the third layer.

16. The tunable optical structure of claim 15, wherein the first layer and the third layer are made from different materials.

17. The tunable optical structure of claim 12, further comprising a mirror disposed underneath the second layer.

18. The tunable optical structure of claim 17, wherein the mirror comprises a Bragg mirror or is made of gold.

19. A tunable optical structure cell comprising a first, a second, a third, and a fourth pairs of nanobars, each of the first and the fourth pair including two adjacent parallel nanobars with a first slot therebetween, and each of the second and the third pair including two adjacent parallel nanobars with a second slot therebetween, and
wherein:
the nanobars are oriented along a first direction, and positioned adjacent to each other along a second direction; the second direction being perpendicular to the first direction;
the first and the second slots are oriented along the first direction;
the first and the second slot comprises, each, notches arranged periodically along the first direction;
the nanobar pairs are positioned adjacent to each other along the second direction such that the second nanobar pair is interposed between the first and the third nanobar pair, and the third nanobar pair is interposed between the second and the fourth nanobar pair;
the first and the fourth nanobar pairs are structurally replicas of each other, and the second and the third nanobar pairs are structurally replicas of each other;
within each of the first and the fourth nanobar pairs, one nanobar is configured to receive a first bias voltage and the other nanobar of the same pair is configured to receive a second bias voltage, the second bias voltage being different from the first bias voltage;
within each of the second and the third nanobar pairs, one nanobar is configured to receive a third bias voltage and the other nanobar of the same pair is configured to receive the first bias voltage, the third bias voltage being different or same from the first bias voltage;
a bias voltage received by two nanobars that are adjacent but belong to different pairs are the same;
the tunable optical structure cell is configured to receive an optical signal, thus generating a first slot resonance in correspondence with the first slots, and a second slot resonance in correspondence with the second slots;
wavelength and quality-factor of the first slot resonance is controlled based on a selection from one or more of a1) a depth along the first or the second direction of each notch of the first slot, b1) a width of each notch of the first slot, c1) a width of the first slot, d1) the period of the notch along the first slot, and a difference of the first and the second bias voltages, and
independently from the wavelength and the quality-factor of the first slot resonance, a wavelength and quality-factor of the second slot resonance is controlled based on a selection from one or more of a1) a depth along the first or the second direction of each notch of the second slot, b1) a width of each notch of the second slot, c1) a width of the second slot, d1) the period of the notch along the second slot, and a difference of the first and the third bias voltages.

20. The tunable optical structure cell of claim 19, wherein the second bias voltage is different from the third bias voltage.

21. The tunable optical structure cell of claim 20, wherein the second and the third bias voltages are positive bias voltages, and the first bias voltage is ground.

22. A tunable optical structure formed by arranging periodically, along the second direction, a multiple tunable optical structure cells of claim 19.

23. A beam-steering structure cell comprising:
a pair of blocking nanobars;
a pair of parallel nanobars with a first slot therebetween; the pair interposed between the blocking nanobars of the pair of blocking nanobars;
a mirror disposed underneath nanobars and blocking nanobars;
wherein:
the nanobars and are oriented along a first direction, and positioned adjacent to each other along a second direction; the second direction being perpendicular to the first direction;
the blocking nanobars are oriented along the first direction and positioned along the second direction;
each first slot is oriented along the first direction;
each first slot comprises notches arranged periodically along the first direction;
one nanobar of the pair of nanobars is configured to receive a first bias voltage and the other nanobar of the pair is configured to receive a second bias voltage, the second bias voltage being different from the first bias voltage;

the beam-steering structure cell is configured to receive an optical signal, thus generating a slot resonance;

a wavelength and quality-factor of the slot resonance is controlled based on a selection from one or more of a) a depth along the first or the second direction of each notch, b) a width of each notch, c) a width of the slot, d) the period of the notch along the first slot, and a difference of the first and the second bias voltages.

24. The beam-steering structure cell of claim 23, wherein the first voltage is a positive voltage, and the second voltage is ground.

25. An optical beam-steering device formed by arranging periodically, along the second direction, a multiple of beam-steering structure cells of claim 23.

26. A method of tuning a wavelength and quality-factor of a resonance of an optical structure, the method comprising:
providing four pairs of nanobars;
disposing the two nanobars of each pair side to side and in parallel with each other;
orienting the nanobars along a first direction and arranging the nanobars along a second direction, the second direction being perpendicular to the first direction;
forming a slot in-between the two bars of each pair of nanobars;
forming notches along each slot; the notches being periodically arranged along the first direction;
adjusting one or more of a) a depth along the first direction of the notches, b) a depth along the second direction of the notches, c) a width of the nanobars, d) the period of the notch along the slot,
in correspondence with a desired slot resonance wavelength;
illuminating the optical structure with an optical signal, thus generating a slot resonance having the desired wavelength in each slot;
applying a first bias voltage to a first nanobar of a first pair of the four pairs of nanobars;
applying a second bias voltage to a second nanobar of the first pair of the four pairs of nanobars;
applying the second bias voltage to a first nanobar of a second pair of the four pairs of nanobars;
applying a third bias voltage to a second nanobar of the second pair of the four pairs of nanobars;
applying the third bias voltage to a first nanobar of a third pair of the four pairs of nanobars;
applying the second bias voltage to a second nanobar the third pair of the four pairs of nanobars;
applying the second bias voltage to a first nanobar of a fourth pair of the four pairs of nanobars, and
applying the first bias voltage to a second nanobar of the fourth pair of the four pairs of nanobars.

27. The method of claim 26, wherein the first bias voltage is different from the second bias voltage.

28. The method of claim 27, where in the second voltage is ground.

* * * * *